United States Patent
Shunji

(10) Patent No.: US 7,969,621 B2
(45) Date of Patent: Jun. 28, 2011

(54) SCANNING DEVICE

(75) Inventor: Murai Shunji, Tokai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 951 days.

(21) Appl. No.: 11/857,529

(22) Filed: Sep. 19, 2007

(65) Prior Publication Data

US 2008/0068679 A1 Mar. 20, 2008

(30) Foreign Application Priority Data

Sep. 20, 2006 (JP) .................................. 2006-253796

(51) Int. Cl.
*H04N 1/04* (2006.01)

(52) U.S. Cl. ........ 358/474; 358/497; 358/496; 358/471; 358/486; 399/367; 399/211; 271/18; 271/109; 382/312

(58) Field of Classification Search .................. 358/474, 358/497, 486, 471, 501, 482; 399/367, 211, 399/212; 382/312, 318, 319; 271/18, 109
See application file for complete search history.

(56) References Cited

U.S. PATENT DOCUMENTS

| | | | |
|---|---|---|---|
| 5,096,316 A | 3/1992 | Otsuka et al. | |
| 6,717,702 B1 * | 4/2004 | Yamauchi et al. | 358/497 |
| 6,903,849 B2 * | 6/2005 | Yokota | 358/497 |
| 6,975,436 B2 * | 12/2005 | Saito | 358/497 |
| 7,095,532 B2 * | 8/2006 | Chang | 358/471 |
| 7,751,100 B2 * | 7/2010 | Chang | 358/497 |
| 2004/0066540 A1 * | 4/2004 | Chang | 358/474 |
| 2004/0184114 A1 * | 9/2004 | Chen | 358/474 |
| 2006/0001916 A1 * | 1/2006 | Sheng et al. | 358/474 |
| 2006/0139701 A1 * | 6/2006 | Kurokawa et al. | 358/474 |
| 2006/0197801 A1 | 9/2006 | Hashii et al. | |
| 2006/0279806 A1 * | 12/2006 | Chang | 358/474 |
| 2007/0024924 A1 * | 2/2007 | Ikeno et al. | 358/474 |

FOREIGN PATENT DOCUMENTS

| | | |
|---|---|---|
| CN | 1743180 A | 3/2006 |
| JP | 2101864 | 4/1990 |
| JP | 2137967 | 5/1990 |
| JP | 5219315 | 8/1993 |

(Continued)

OTHER PUBLICATIONS

Notice of Reasons for Rejection, mailed Oct. 14, 2008, Japanese Patent Application No. 2006-253796, 3 pages.

(Continued)

*Primary Examiner* — Negussie Worku

(74) *Attorney, Agent, or Firm* — Banner & Witcoff, Ltd.

(57) ABSTRACT

A scanning device may include a first structural member and a second structural member, a movable body that is configured to reciprocate between the first structural member and the second structural member, and a cable of which a first end is fixed to one of the first and second structural members and a second end fixed to the movable body. The cable may have a curved portion between the first end and the second end thereof. The scanning device may further include an elastic member of which a first end portion is fixed to one of the first and second structural members to which the first end of the cable is fixed, and a second end portion is engaged to the curved portion. The elastic member may be configured to elastically urge the cable in a direction opposite to the curving direction of the curved portion.

20 Claims, 16 Drawing Sheets

FOREIGN PATENT DOCUMENTS

| | | |
|---|---|---|
| JP | 6022101 | 1/1994 |
| JP | 6098107 | 4/1994 |
| JP | 7321973 | 12/1995 |
| JP | 9109508 | 4/1997 |
| JP | 2004348074 | 12/2004 |
| JP | 2005049612 | 2/2005 |
| JP | 2005057628 | 3/2005 |
| JP | 2006082381 | 3/2006 |
| JP | 2006096028 | 4/2006 |

OTHER PUBLICATIONS

Notification of First Office Action for Chinese Application No. 200710153760.6 issued Oct. 16, 2009.

* cited by examiner

# SCANNING DEVICE

CROSS REFERENCE TO RELATED APPLICATION

This application claims priority from Japanese Patent Application No. 2006-253796, filed on Sep. 20, 2006, the entire subject matter of which is incorporated herein by reference.

TECHNICAL FIELD

The invention relates to a scanning device in which a cable having a curved portion between its first and second ends is provided to a movable body that is configured to reciprocate between a first structural member and a second structural member.

BACKGROUND

Various types of systems and devices (e.g., flatbed scanners and inkjet printers) include a scanning device having a cable provided to a movable body and configured to reciprocate between a first structural member and a second structural member. In a flatbed scanner, for instance, a casing functions as the first structural member, a platen glass functions as the second structural member, and a carriage equipped with an image sensor functions as the movable body. The carriage is configured to reciprocate the image sensor along the platen glass (i.e., move the image sensor back and forth along the platen glass). In the example of an inkjet printer, a guide rail functions as the first structural member, a cover functions as the second structural member, and a carriage equipped with a recording head functions as the movable body. The carriage is configured to reciprocate the recording head along the guide rail.

FIG. 16 shows an internal structure of a flatbed scanner 100 including a known scanning device. The flatbed scanner 100 includes a casing 101 and a platen glass 102, which form a housing of the flatbed scanner 100. In particular, the platen glass 102 forms at least a part of a top of the housing. The flatbed scanner 100 may further include a carriage 103 in an internal space of the housing. The carriage 103 is configured to reciprocate along a guide shaft 104 that is disposed such that its axis extends in parallel to the platen glass 102. A drive mechanism (not shown) for reciprocating the carriage 103 may also be included in flatbed scanner 100.

The carriage 103 is equipped with an image sensor 105, which may include, for example, a contact image sensor (CIS). The image sensor 105 irradiates the platen glass 102 with light such that at least a portion of the light passes through platen glass 102 and hits a document or material to be scanned. The image sensor 105 may further detect an intensity of light reflected from the document placed on the platen glass 102. The image sensor 105 then outputs an electrical signal in accordance with the intensity of the reflected light. The image sensor 105 is connected with an electrical cable 106 configured to output an electrical signal and to supply power to a light source. The electrical cable 106 is connected at one end to the image sensor 105 and is fixed at its other end by a fixing portion 107 provided at a bottom of the casing 101. The electrical cable 106 is drawn to the outside of the casing 101 through the fixing portion 107 so as to extend to a control board. The electrical cable 106 is electrically connected to the control board.

The electrical cable 106 is routed so as to make a U-turn (a curved portion 108) at a portion thereof extending between the image sensor 105 and the fixing portion 107 such that the curved portion 108 has a substantially U-shaped configuration. As the carriage 103 reciprocates along the platen glass 102, the image sensor 105 reciprocates together with the carriage 103. At that time, the electrical cable 106 follows the reciprocating movement of the image sensor 105 causing the shape and position of the curved portion 108 of the electrical cable 106 to change. In FIG. 16, the various positions and shapes of electrical cable 106 as it follows the image sensor 105 is illustrated by double dotted lines.

The electrical cable 106 generally includes wires as conductors and a resin for insulating the conductors. When a plurality of wires are used to form the electrical cable 106, the wires are placed so as to run parallel to each other and are insulated with a resin so as to form a single member. In such a configuration, the wide electrical cable 106 is often referred to as a flat or ribbon cable. Further, because the wires and the resin both have flexibility, the electrical cable 106 is a flexible flat cable. While a bending strength of electrical cable 106 may vary depending on a size of the wires and a thickness of the resin, the bending strength of the electrical cable 106 generally corresponds to an allowable range to follow the reciprocating movement of the image sensor 105.

As shown in FIG. 16, in the electrical cable 106 that follows the reciprocating movement of the image sensor 105, a diameter of the curved portion 108 changes in accordance with the position of image sensor 105. When the curved portion 108 of the electrical cable 106 is located at a position near the image sensor 105, for example, the diameter of the curved portion 108 is relatively small. As a distance between the curved portion 108 of the electrical cable 106 and the image sensor 105 becomes greater, the diameter of the curved portion 108 becomes relatively larger. As indicated by the double dotted line in FIG. 16, depending on the bending strength of the electrical cable 106, the curved portion 108 of the electrical cable 106 may try to extend beyond a distance between the casing 101 and the platen glass 102. In this case, the electrical cable 106 makes contact with the platen glass 102 (i.e., platen glass 102 restricts expansion of curved portion 108).

If the image sensor 105 is moved leftward from a position shown in FIG. 16 while the electrical cable 106 is in contact with the platen glass 102, the curved portion 108 of the electrical cable 106 may not be smoothly moved due to frictional resistance caused by the contact between the curved portion 108 and the platen glass 102. As a result, the electrical cable 106 may buckle at a portion thereof indicated by an arrow 109 in FIG. 16. Such a problem may occur not only when the carriage 103 reciprocates to read an image by the image sensor 105 but also when the carriage 103 moves during transport of the flatbed scanner 100.

SUMMARY

Embodiments provide for a scanning device in which buckling may be prevented from occurring in a cable configured to follow a movement of a movable body of the scanning device.

A scanning device may include a first structural member and a second structural member (e.g., disposed opposite to each other and at a specified distance from each other), a movable body that is configured to reciprocate between the first structural member and the second structural member, and a cable of which a first end is fixed to one of the first and second structural members and a second end fixed to the movable body. In one example, the movable body may be configured to reciprocate within a predetermined range along at least one of the first and second structural members. The cable may include a curved portion between the first end and the second end thereof. The scanning device may further include an elastic member of which a first end portion is fixed to one of the first and second structural members to which the first end of the cable is fixed (e.g., at an outer surface of the curved portion with respect to a curving direction of the curved portion), and of which a second end portion is engaged to a curved portion of the cable (e.g., the second portion may be engaged to an inner surface of the curved portion with respect to the curving direction of the curved portion). The elastic member elastically urges the cable in a direction opposite to the curving direction of the curved portion.

According to one embodiment, the movable body may be configured to reciprocate between the first structural member and the second structural member along at least one of the first and second structural members. Additionally, the cable fixed to the movable member may move in accordance with a reciprocating movement of the movable body. The cable may be routed to the movable body from one of the first and second structural members. A portion of the cable extending between the movable body and one of the first and second structural members might not be fixed and may form a curved portion therebetween. The curved portion may also move in accordance with the reciprocating movement of the movable body. That is, in one embodiment, the position of the curved portion of the cable may change in accordance with the reciprocating movement of the movable body. The elastic member may be fixed to one of the first and second structural members and may be configured to elastically urge the cable in the direction opposite to the curving direction of the curved portion. The cable is extended along the one of the first and second structural members by the elastic urging force. Thus, the cable can be smoothly moved in accordance with the reciprocating movement of the movable body.

BRIEF DESCRIPTION OF THE DRAWINGS

Illustrative aspects will be described in detail with reference to the following figures in which like elements are labeled with like numbers and in which.

DETAILED DESCRIPTION

Illustrative embodiments will be described in detail with reference to the accompanying drawings.

In a first illustrative embodiment, a scanning device of the invention is applied to an image reading device, such as a flatbed scanner.

A multifunctional machine 1 has a scanning function and a printing function. A flatbed scanner 2 is integrally provided at an upper portion of the multifunctional machine 1 for providing the scanning function of the multifunctional machine 1. An inkjet printer 3 is integrally provided at a lower portion of the multifunctional machine 1 so as to provide the printing function of the multifunction machine 1. The printing function may be an optional function for the image reading device. For example, the image reading device may include a flatbed scanner having a scanning function only.

Figure 1:
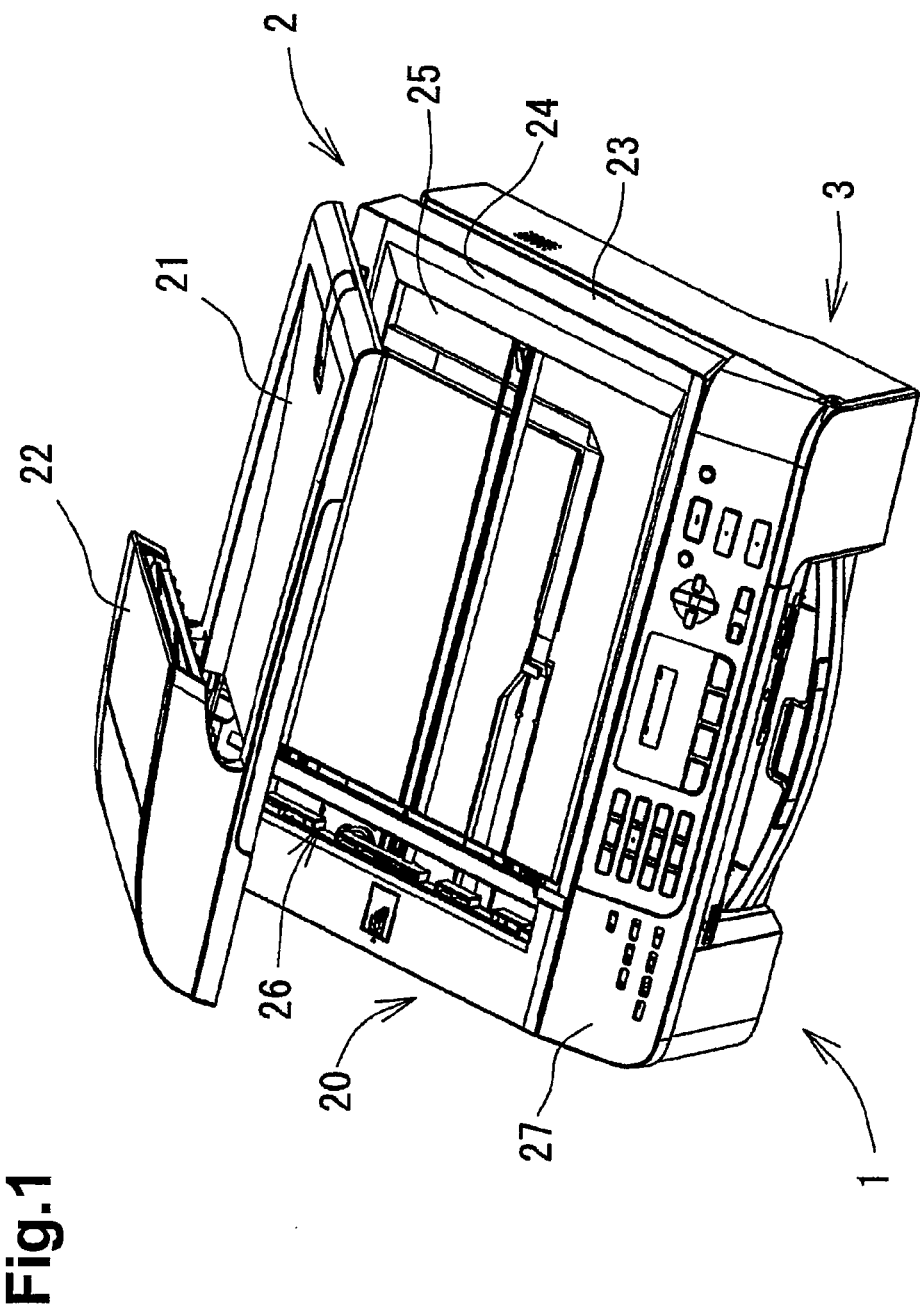
FIG. 1 is a perspective view showing an appearance of a multifunctional machine including a flatbed scanner according to an illustrative embodiment.

As shown in FIG. 1, the flatbed scanner 2 includes a cover 21, which is attached to a document receiving section 20 so as to cover and uncover with respect to the document receiving section 20. The cover 21 is equipped with an automatic document feeder 22, which is an optional element.

Next, a structure of the document receiving section 20 will be described. The document receiving section 20 includes a bottom frame 23 and an upper cover 24, which are assembled with each other to provide a box-shaped housing. The upper cover 24 has an opening substantially in the middle thereof. A platen glass 25 is provided so as to align with the opening of the upper cover 24 through which platen glass 25 is exposed. The platen glass 25 serves as a part of an upper face of the document receiving section 20. The exposed platen glass 25 functions as a reading area in the flatbed scanner 2. An image reading unit 26 is provided in an internal space of the document receiving section 20 structured as described above. The image reading unit 26 is configured to reciprocate within the space defined by the bottom frame 23 and the platen glass 25. In other words, the bottom frame 23 and the platen glass 25 are opposingly disposed at a distance away from each other sufficient for the image reading unit 26 to reciprocate therebetween. The bottom frame 23 and the platen glass 25 function as a first structural member and a second structural member, wherein a correspondence therebetween can be arbitrarily determined.

The multifunctional machine 1 further includes an operating panel 27 having a known structure. The operating panel 27 includes various operating keys and a crystal liquid display. The flatbed scanner 2 performs an operation in accordance with instructions inputted through the operating panel 27. The flatbed scanner 2 is connected to a computing device such as a computer (e.g., a PC). The flatbed scanner 2 also operates in accordance with instructions transmitted from the computer through a scanner driver.

Figure 2:
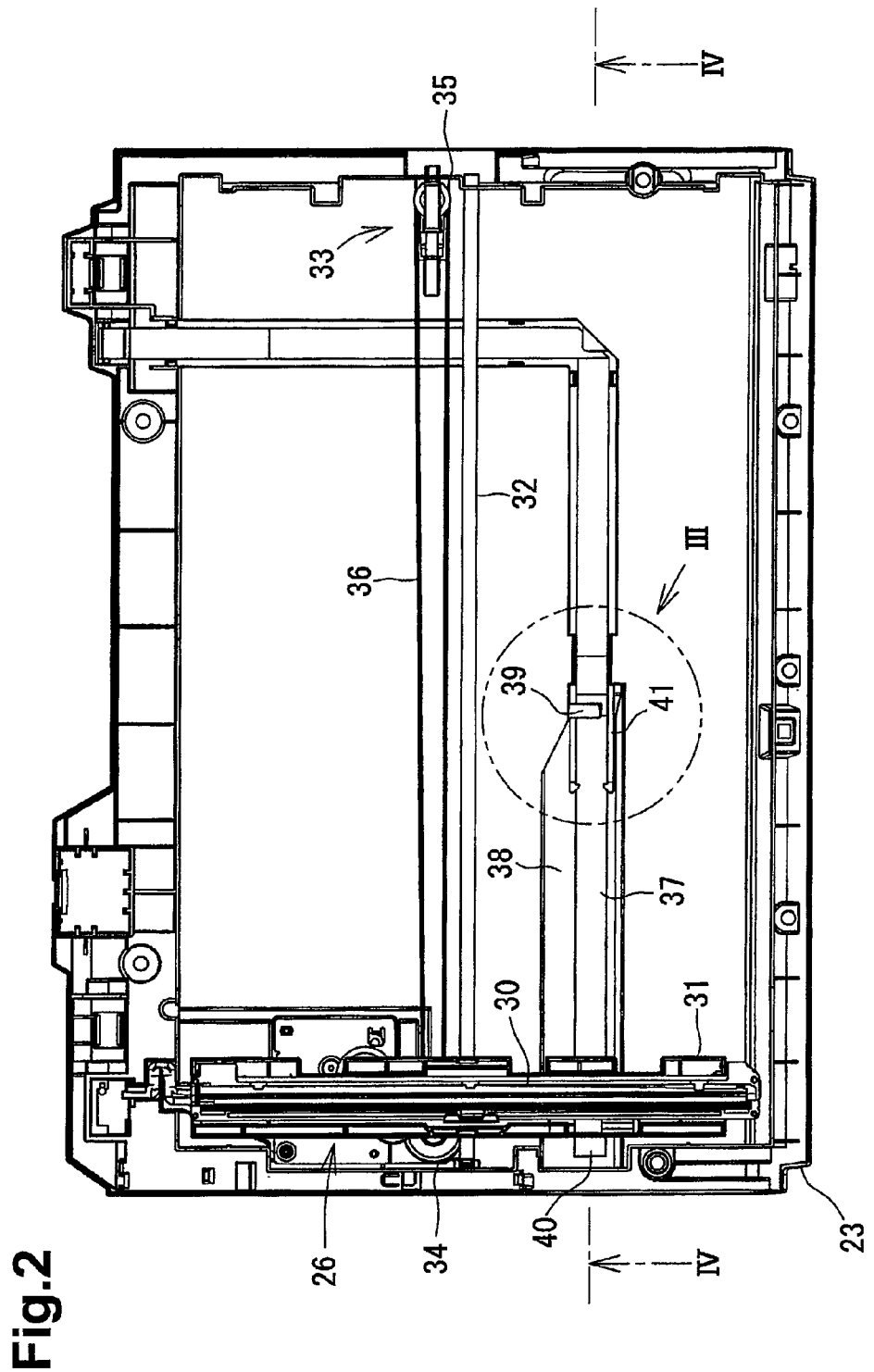
FIG. 2 is a plan view showing an internal structure of the flatbed scanner.

FIG. 2 is a plan view of the document receiving section 20 where the upper cover 24 and the platen glass 25 are removed therefrom. As shown in FIG. 2, the image reading unit 26 is disposed in the bottom frame 23. The bottom frame 23 is a tray shape member with a rectangular bottom plate and a rim. The bottom frame 23 includes supporting ribs for supporting the platen glass 25, bosses for fixing various members by screws, and through holes for routing electrical wires. The bottom frame 23 may be configured in accordance with various embodiments of the document receiving section 20.

The image reading unit 26 includes an image sensor 30, a carriage 31, a guide shaft 32, and a belt drive mechanism 33. The carriage 31 equipped with the image sensor 30 is reciprocated along the guide shaft 32 by the belt drive mechanism 33. The image sensor 30 and the carriage 31 function as a movable body.

The image sensor 30 is a contact image sensor, generally referred to as a CIS. The image sensor 30 irradiates a document placed on the platen glass 25 with light, and outputs an electrical signal by converting light reflected from the document through a photoelectric conversion process. The carriage 31 is attached to the guide shaft 32 so as to be slidable thereon. The guide shaft 32 is attached to the bottom frame 23 so as to extend in a width direction of the bottom frame 23 (in a left-right direction of FIG. 2).

The belt drive mechanism 33 includes a drive pulley 34, a follower pulley 35, and a timing belt 36 wound around and extended between the drive pulley 34 and the follower pulley 35. The timing belt 36 is an endless belt formed with teeth on its inner surface. The drive pulley 34 and the follower pulley 35 are positioned at a distance away from each other in an axial direction of the guide shaft 32. A distance between the drive pulley 34 and the follower pulley 35 is determined based on a reciprocating range of the carriage 31. The timing belt 36 extends in parallel to the axial direction of the guide shaft 32. A rotation of a motor is outputted to a shaft of the drive pulley 34. When the drive pulley 34 rotates, the timing belt 36 travels around the drive pulley 34 and the follower pulley 35. A bottom of carriage 31 is connected to the timing belt 36. With this structure, as timing belt 36 travels around drive pulley 34 and follower pulley 35, the carriage 31 reciprocates between the drive pulley 34 and the follower pulley 35 along the guide shaft 32. The image sensor 30 provided to the carriage 31 reciprocates together with the carriage 31. The image sensor 30 is disposed such that its top surface is positioned close to the platen glass 25. Therefore, the image sensor 30 reciprocates along the platen glass 25 based on a reciprocating movement of the carriage 31.

Next, a flat cable 37 will be described. The flat cable 37 is made of conducting wires insulated with a resin. In the flat cable 37, a plurality of conducting wires are placed in parallel to each other and each of the wires are insulated with a resin. With this structure, the flat cable 37 has a band shape having a certain width. The flat cable 37 has flexibility with an appropriate bending strength. The flat cable 37 electrically connects a control board and the image sensor 30 to each other. The flat cable 37 is routed between the image sensor 30 and the control board while being warped or bent at appropriate points thereof.

Although not shown in FIG. 2, a connector is provided at a bottom of the image sensor 30. The connector electrically connects the flat cable 37 to the image sensor 30. Terminals of the connector are electrically connected with LEDs (light emitting diodes) of the image sensor 30 and optoelectronic devices. Because the flat cable 37 is connected to the connector, electronic signals are transmitted between the connector and the control board through the flat cable 37. Although the control board is not shown in FIG. 2, the control board may be disposed below the operating panel 27, as a control portion for controlling the operation of the multifunctional machine 1, for example (see FIG. 1). In one or more embodiments, the control board includes a processing unit (e.g., a CPU) that performs various operations, a ROM that stores various control programs and/or instructions, a RAM that temporarily stores data therein, and/or an ASIC that drives a drive circuit and various interfaces. The one end of the flat cable 37 connected to the control board functions as a first end of the cable of the invention, and the other end of the flat cable 37 connected to the connector of the image sensor 30 functions as a second end.

As shown in FIG. 2, the flat cable 37 is extended from the image sensor 30 and is engaged to the bottom frame 23 at a predetermined position. The bottom frame 23 is provided with a guide groove 38 that extends in the axial direction of the guide shaft 32, i.e. in a reciprocating direction of the carriage 31, from one end of the reciprocating range of the carriage 31. The guide groove 38 is recessed to accommodate the flat cable 37 therein. The guide groove 38 extends toward the other end of the reciprocating range of the carriage 31 across a middle portion of the reciprocating range of the carriage 31. The guide groove 38 then turns at a substantially right angle and further extends toward a back of the bottom frame 23. The flat cable 37 is routed to the back of the bottom frame 23 while being accommodated in the guide groove 38. Although not shown in FIG. 2, the flat cable 37 may further extend to the bottom of the bottom frame 23 to connect to the control board.

Figure 3:
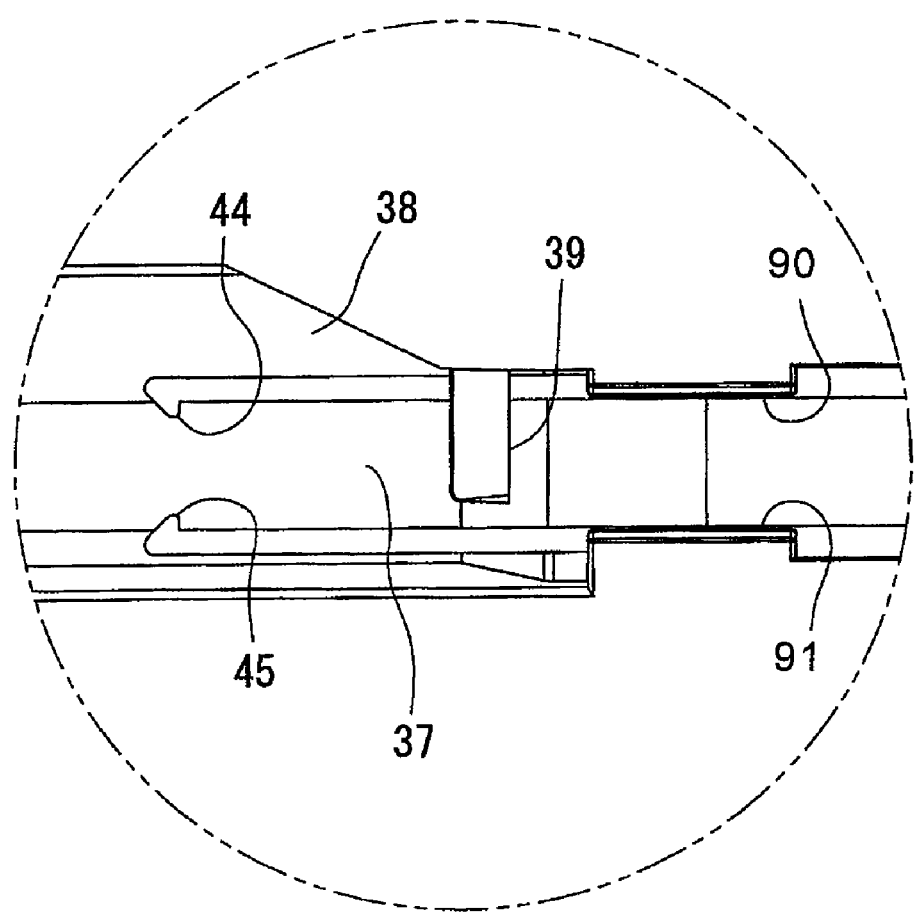
FIG. 3 is an enlarged view of an area designated by arrow III of FIG. 2.

As shown in FIGS. 2 and 3, in the guide groove 38, a retainer 39 is provided at a substantially middle position in the reciprocating range of the carriage 31. The retainer 39 presses the flat cable 37 from above to hold/restrict the flat cable 37 in the guide groove 38. As shown in FIG. 3, the guide groove 38 is provided with projections 90, 91, which protrude toward the inside of the guide groove 38 from both edges of the guide groove 38 in a width direction of the guide groove 38 (in a top-bottom direction in FIG. 3). The projections 90, 91 press side edges of the flat cable 37 from above. With this structure, the flat cable 37 is prevented from coming out from the guide groove 38. Although not shown in FIG. 2, a plurality of projections 90, 91 are provided in a similar manner at appropriate points along the guide groove 38 in an area between the retainer 39 and the image sensor 30. The flat cable 37 has a free portion, which is not retained, between the retainer 39 and the bottom frame 23. Therefore, the flat cable 37 may move into and out of the guide groove 38 in accordance with a location of the image sensor 30.

Figure 4:
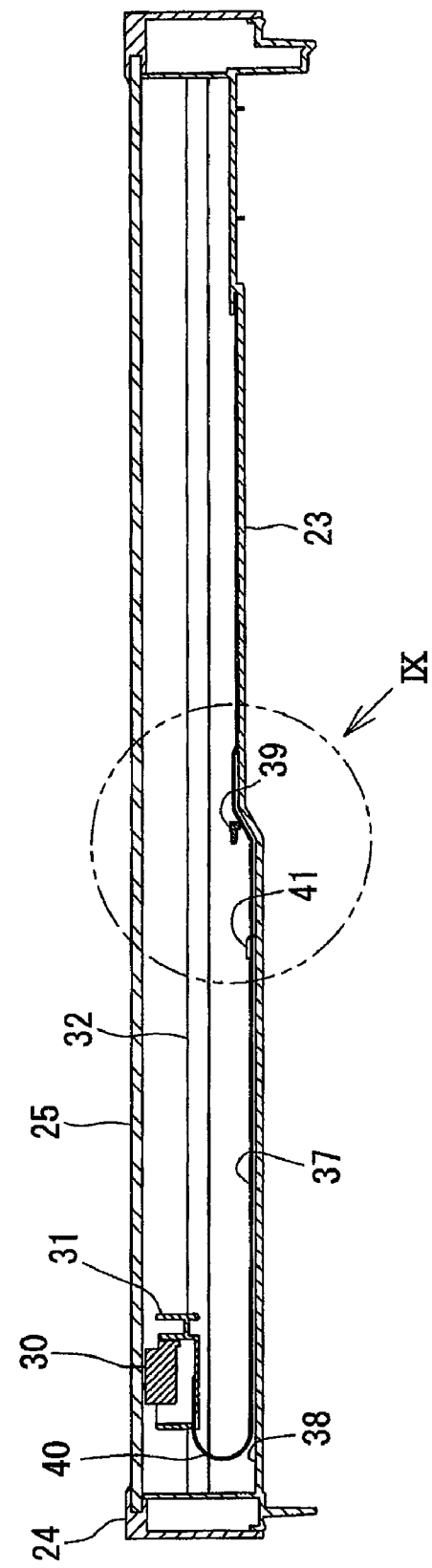
FIG. 4 is a schematic sectional view taken along a line IV-IV in FIG. 2 and in the direction of the appended arrows.

Referring to FIG. 4, the first illustrative embodiment will be further described. Although not shown in FIG. 2, the upper cover 24 and the platen glass 25 are shown in FIG. 4. The flat cable 37 is routed so as to make a U-turn to have a substantially U-shaped curved portion 40 between the image sensor 30 and the retainer 39. When the image sensor 30 reciprocates along the guide shaft 32 together with the carriage 31, the flat cable 37 follows the reciprocating movement of the image sensor 30 while its position and shape changes and the curved portion 40 moves between the image sensor 30 and the retainer 39 (see FIGS. 7 and 8).

An elastic member 41 will be described. As shown in FIGS. 2 and 4, the elastic member 41 is provided at a position where the flat cable 37 is held by the retainer 39, so as to extend along the flat cable 37. The elastic member 41 is fixed at its one end by the retainer 39 together with the flat cable 37, and is engaged at its other end with the flat cable 37. In the elastic member 41, the side held by the retainer 39 functions as a first end side, and the side engaged with the flat cable 37 functions as a second end side. The elastic member 41 is disposed on an outer surface of the curved portion 40 of the flat cable 37. With this structure, the elastic member 41 elastically urges the flat cable 37 against the curve of the curved portion 40 of the flat cable 37.

Referring to FIGS. 2 to 5, a structure of the elastic member 41 will be described in detail.

Figure 6:
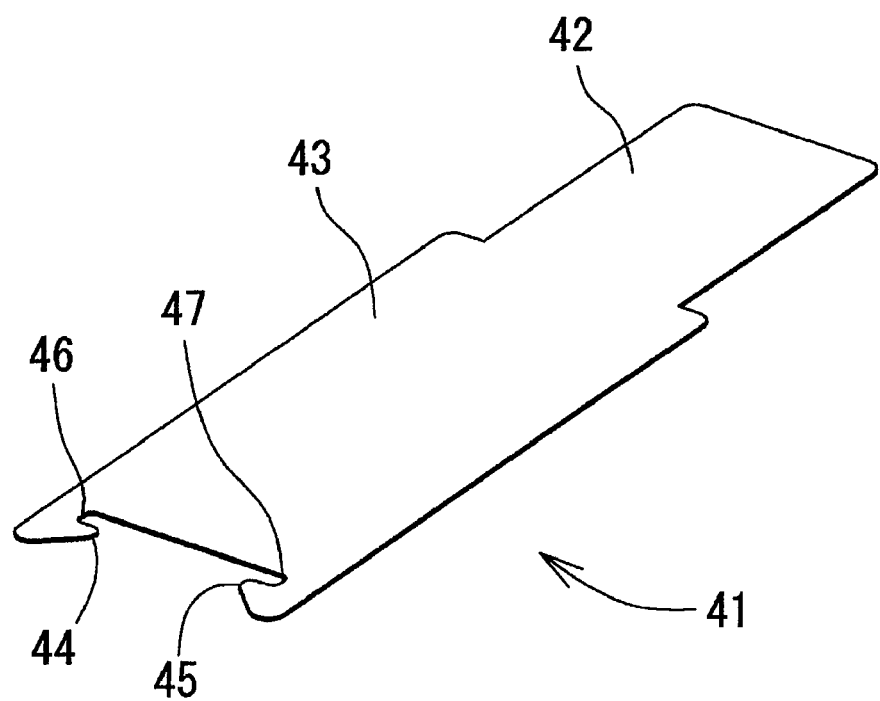
FIG. 6 is a perspective view showing a structure of the elastic member of FIG. 5.

As shown in the plan view of FIG. 6, the elastic member 41 is a substantially rectangular thin plate. The elastic member 41 is capable of being elastically deformed so as to be curved, and is configured to elastically return to its original state (a straight posture) as shown in FIG. 6. In one or more arrangements, the elastic member 41 is made of a thin plate of metal, for example, spring steel or phosphor bronze, or is made of a thin plate of synthetic resin, for example, polyethylene terephthalate (PET).

The elastic member 41 includes a fixed portion 42 and a deforming portion 43. As shown in FIGS. 2 and 4, the fixed portion 42 of the elastic member 41 is fixed at a predetermined position in the guide groove 38 by the retainer 39 together with the flat cable 37. The fixed portion 42 has a width that is substantially the same as that of the flat cable 37. The deforming portion 43 of the elastic member 41 generally extends along the flat cable 37 toward the image sensor 30 from the retainer 39. According to one or more aspects, the deforming portion 43 may have a width that is greater than that of the flat cable 37. With respect to an arrangement direction of the fixed portion 42 and the deforming portion 43 of the elastic member 41, the end portion of the elastic member 41 functioning as the fixed portion 42 corresponds to a first end portion of the elastic member 41 and the end portion of the elastic member 41 functioning as the deforming portion 43 corresponds to a second end portion of the elastic member 41. The fixed portion 42 may be fixed in the guide groove 38 by an adhesive tape in addition to or instead of the retainer 39.

The deforming portion 43 of the elastic member 41 is formed with hooks 44, 45, which protrude toward the center of the deforming portion 43 from edges of the deforming portion 43 in a width direction of the deforming portion 43. According to one or more arrangements, a distance between the hook 44 and the hook 45 is narrower than the width of the flat cable 37. The hooks 44, 45 form cutouts 46, 47 in the deforming portion 43. The cutouts 46, 47 are generally disposed inside of the hooks 44, 45. Further, a distance between the cutout 46 and the cutout 47 may be equal to or slightly greater than the width of the flat cable 37. In one or more embodiments, the hooks 44, 45 are integrally formed with the elastic member 41. Thus, the hooks 44, 45 are capable of being elastically deformed like the elastic member 41.

Figure 5:
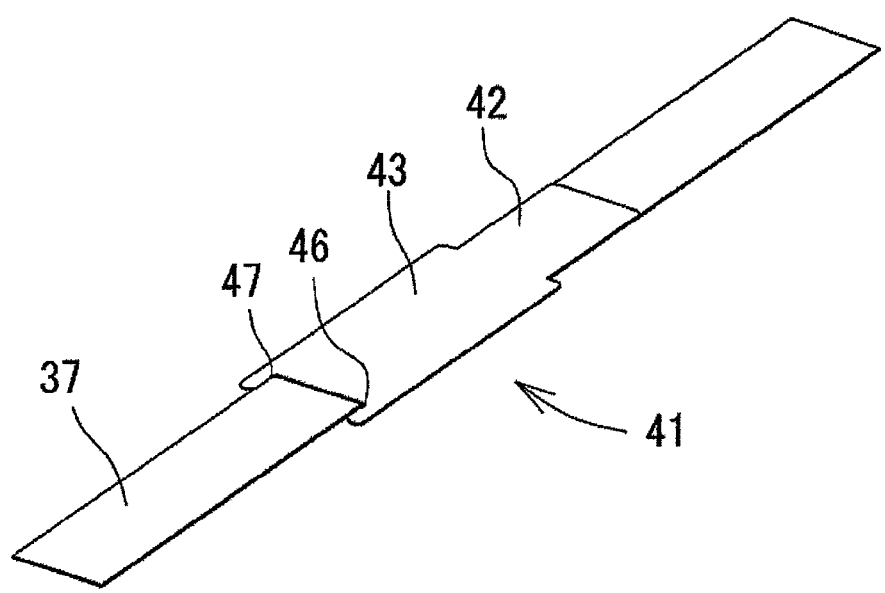
FIG. 5 is a perspective view showing a back side of an elastic member engaged with a flat cable.

As shown in FIG. 5, the elastic member 41 is engaged with the flat cable 37 via the hooks 44, 45. The elastic member 41 is placed on the back side of the flat cable 37 (on the opposite side shown in FIGS. 2 and 3 or on the outer surface of the curved portion 40 of the flat cable 37) so as to extend along a length of the flat cable 37. Then, the hooks 44, 45 are engaged with the flat cable 37 from both lateral sides of the flat cable 37 so as to contact the front side of the flat cable 37 (on the inner surface of the curved portion 40 of the flat cable 37). The flat cable 37 is further inserted into the cutouts 46, 47. By doing so, the elastic member 41 is engaged with the flat cable 37. As shown in FIG. 4, because the elastic member 41 engaged with the flat cable 37 is fixed by the retainer 39, the deforming portion 43 of the elastic member 41 extends in a horizontal direction along the bottom of the bottom frame 23. This state may be referred to as the original state of the elastic member 41.

Figure 7:
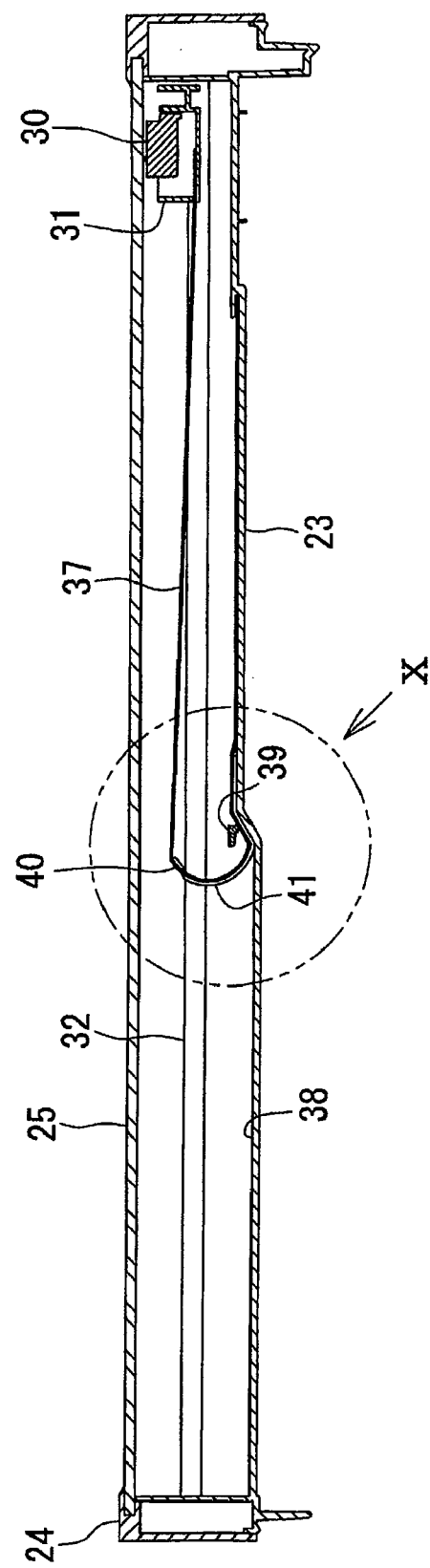
FIG. 7 is a schematic sectional view taken along the line IV-IV in FIG. 2, and in the direction of the appended arrows, wherein a carriage is positioned at a farthest readable position.

A length (in the arrangement direction of the fixed portion 42 and the deforming portion 43 or in the extending direction of the flat cable 37) of the deforming portion 43 of the elastic member 41 is determined in accordance with the reciprocating range of the carriage 31 and the position of the curved portion 40 of the flat cable 37. The reciprocating range of the carriage 31 may generally be defined as a range between a standby position of the carriage 31 where the carriage 31 rests during standby and a farthest readable position opposite to the standby position and defined by a maximum document length that can be read in the image reading unit 26. In FIG. 4, the carriage 31 is located at the standby position. In FIG. 7, the carriage 31 is located at the farthest readable position. Thus, in one or more embodiments, a first position and a second position of the movable body correspond to a position indicated in FIG. 7 and a position indicated in FIG. 4, respectively.

In the state shown in FIG. 7, a distance between the image sensor 30 and the curved portion 40 of the flat cable 37 is at a maximum length. In this state, a portion of the flat cable 37 immediately adjacent to a portion of the flat cable 37 retained by the retainer 39 is curved. That is, the curved portion 40 of the flat cable 37 is located at a position nearest to the retainer 39. The flat cable 37 straightly extends toward the image sensor 30 from the curved portion 40 thereof. In the elastic member 41, the fixed portion 42 is fixed by the retainer 39 and the end portion of the deforming portion 43 is engaged with the flat cable 37 through the hooks 44, 45. Therefore, the deforming portion 43 is curved along the curved portion 40 of the flat cable 37. In this state, an elastic force is exerted by elastic member 41 in a direction that urges the curved portion 40 to a straight/flat posture, that is, in a direction that is opposite to a curving direction of the curved portion 40.

In the state shown in FIG. 4, the distance between the image sensor 30 and the curved portion 40 of the flat cable 37 is at a minimum length. The flat cable 37 straightly/flatly extends from the retainer 39 along the guide groove 38 in the bottom frame 23. The curved portion 40 of the flat cable 37 is located near a distal end of the guide groove 38 (relative to retainer 39). That is, the curved portion 40 of the flat cable 37 is located at a farthest position from the retainer 39. In this state, the elastic member 41 is in its original state and extends straight as shown in FIG. 6. The elastic member 41 is provided under the flat cable 37, so that a weight of the flat cable 37 acts on the elastic member 41.

Hereinafter, the action of the elastic member 41 in accordance with the reciprocating movement of the image sensor 30 and the carriage 31 will be described.

Figure 8:
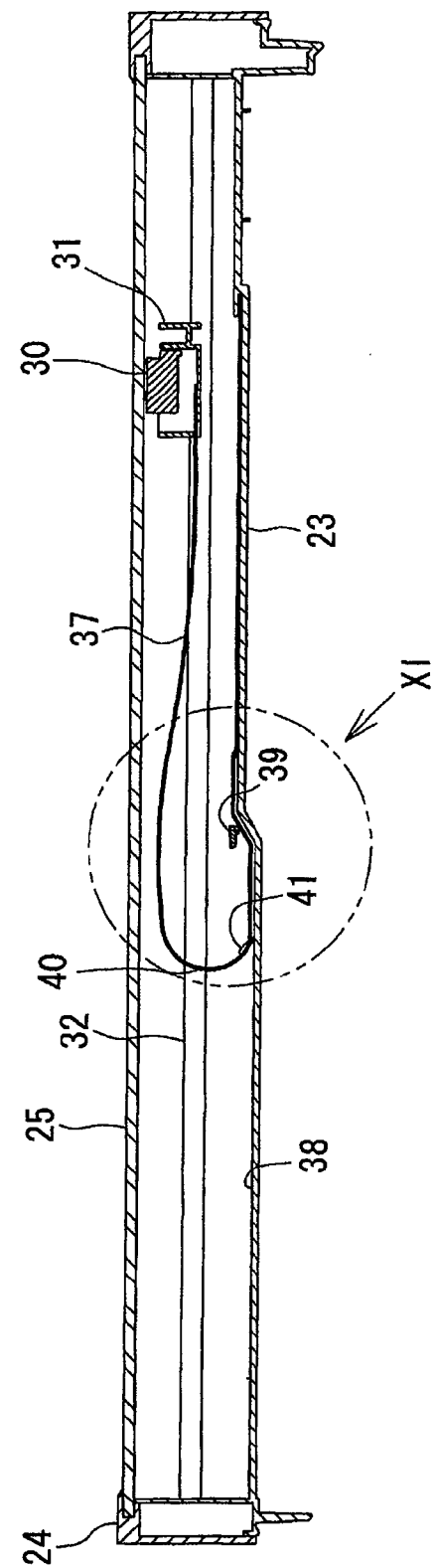
FIG. 8 is a schematic sectional view taken along a line IV-IV in FIG. 2, in the direction of the appended arrows, illustrating a state after the carriage has reciprocated.

As shown in FIGS. 4, 7 and 8, the carriage 31 reciprocates along the platen glass 25 in the space provided between the bottom frame 23 and the platen glass 25. The image sensor 30 provided on the carriage 31 reciprocates together with the carriage 31. Along with this, the flat cable 37 connected to the image sensor 30 follows the reciprocating movement of the image sensor 30. In the flat cable 37, the position of the curved portion 40 is changed as the flat cable 37 follows the image sensor 30. In the state shown in FIG. 4, the curved portion 40 of the flat cable 37 is located at the nearest position with respect to the image sensor 30. In the state shown in FIG. 7, the curved portion 40 of the flat cable 37 is located at the farthest position with respect to the image sensor 30.

Figure 10:
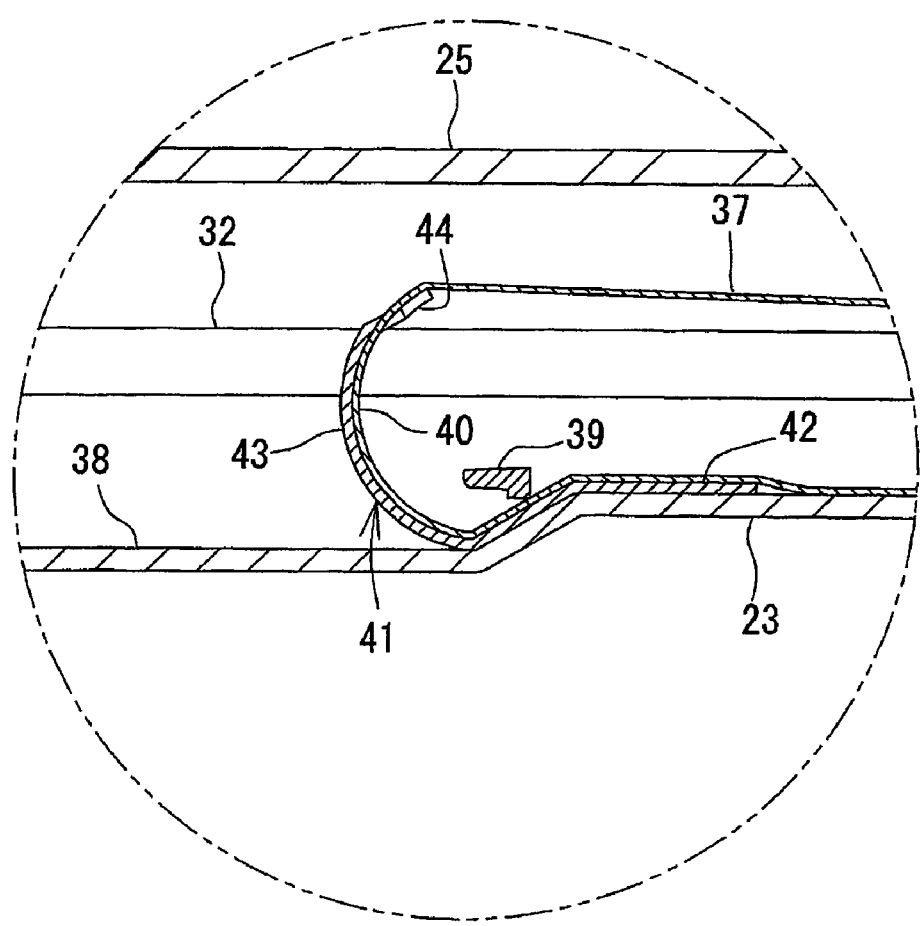
FIG. 10 is an enlarged view of an area designated by arrow X of FIG. 7.

In the state shown in FIGS. 7 and 10, the elastic member 41 is elastically deformed along the curved portion 40 of the flat cable 37. Therefore, the elastic urging force that acts in the direction opposite to the curving direction of the curved portion 40 is applied to the flat cable 37. Thus, the flat cable 37 extending between the curved portion 40 thereof and the image sensor 30 is urged to straighten under a tension caused by the elastic urging force.

Figure 9:
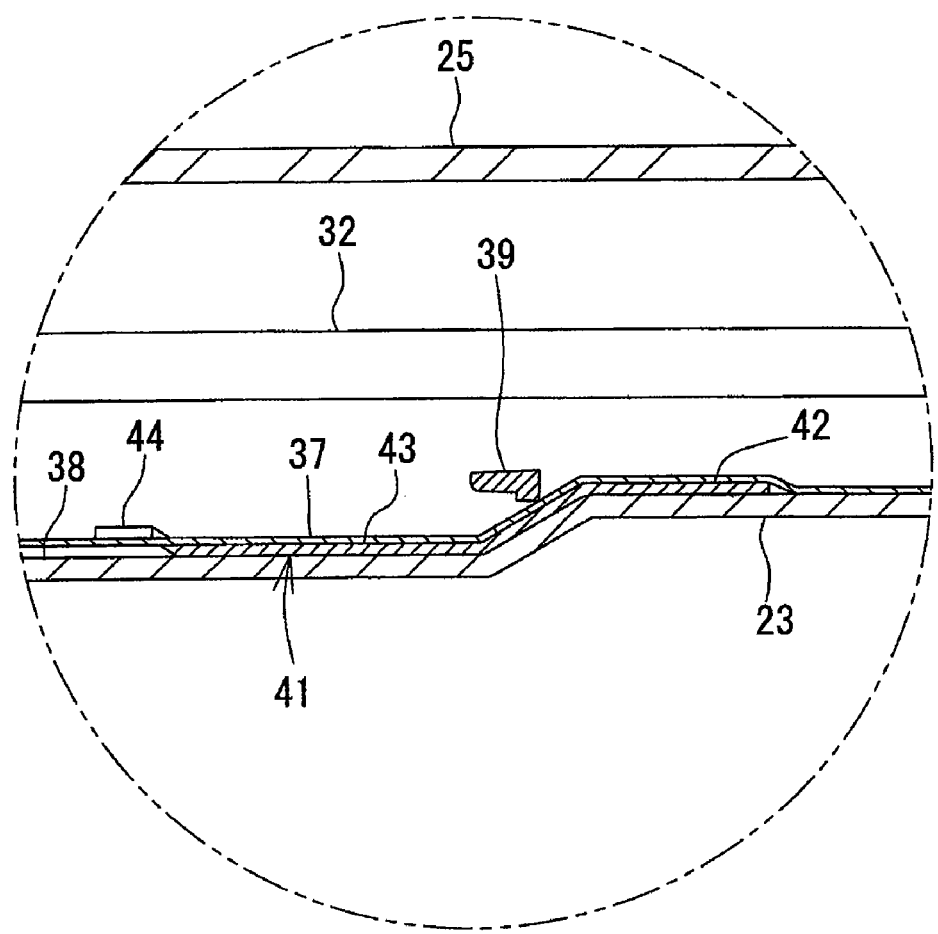
FIG. 9 is an enlarged view of an area designated by arrow IX of FIG. 4.
Figure 11:
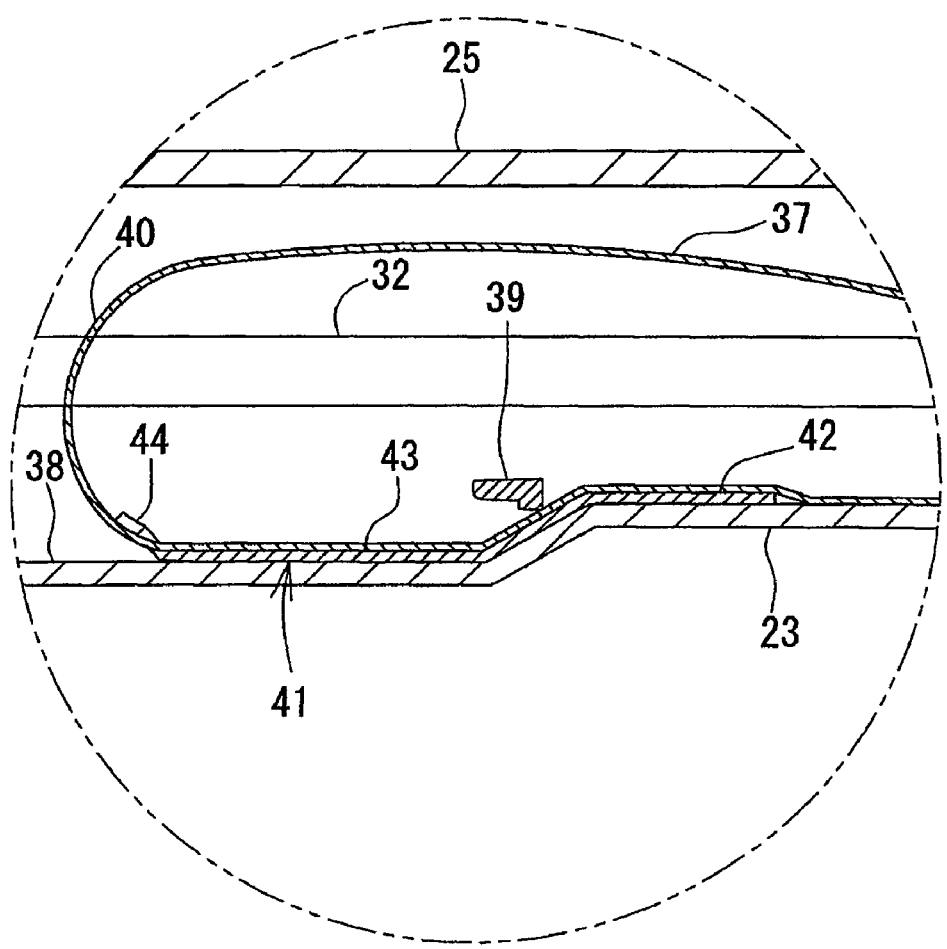
FIG. 11 is an enlarged view of an area designated by arrow XI of FIG. 8.

When the carriage 31 moves toward the position shown in FIG. 4 from the position shown in FIG. 7, the curved portion 40 of the flat cable 37 also moves in the same direction. In accordance with the shift of the curved portion 40, the elastic member 41 gradually elastically returns to its original state. In a state shown in FIGS. 8 and 11, the end portion of the deforming portion 43 of the elastic member 41 is still slightly elastically deformed. When the carriage 31 reaches the position shown in FIG. 4, the elastic member 41 elastically returns to its original state to become completely straight as shown in FIG. 9.

While the elastic member 41 is being elastically deformed, the flat cable 37 is elastically urged by the elastic member 41 toward the direction opposite to the curving direction of the curved portion 40. Therefore, an appropriate tension acts on the portion of the flat cable 37 extending between the curved portion 40 and the image sensor 30 and thus the portion of the flat cable 37 is kept straight. In accordance with the movement of the carriage 31 from the position of FIG. 4 to the position of FIG. 7, the diameter of the curved portion 40 becomes greater by its own bending strength. The elastic member 41 elastically urges the flat cable 37 in the direction opposite to the curving direction of the curved portion 40 such that the flat cable 37 is engaged (with or without contact) with the guide groove 38 of the bottom frame 23. Therefore, the diameter of the curved portion 40 of the flat cable 37 is restricted from becoming larger by the elastic urging force exerted by elastic member 41. As a result, the flat cable 37 is prevented from contacting the platen glass 25 that would otherwise occur due to the unrestricted increase of the diameter of the curved portion 40. In addition, elastic member 41 prevents the flat cable 37 from buckling at the portion extending between the curved portion 40 thereof and the image sensor 30 if the flat cable 37 contacts the platen glass 25. Accordingly, the elastic member 41 allows the flat cable 37 to smoothly move in accordance with the reciprocating movement of the image sensor 30 and the carriage 31.

The elastic member 41 is engaged with the flat cable 37 via the hooks 44, 45. Therefore, the flat cable 37 and the elastic member 41 may be readily assembled with each other. Once assembled, the flat cable 37 and the elastic member 41 might not be easily separated from each other.

The elastic member 41 is elastically deformed along the curved portion 40 of the flat cable 37 when the distance between the curved portion 40 and the image sensor 30 is at a maximum length. When the image sensor 30 in the above positional relationship moves toward the standby position of the carriage 31 from the farthest readable position, buckling may easily occur in the flat cable 37. During the movement, the elastic member 41 elastically urges the flat cable 37 to straighten, thereby preventing buckling of the flat cable 37.

The elastic member 41 elastically returns to its original state when the distance between the curved portion 40 of the flat cable 37 and the image sensor 30 is at a minimum length. When the image sensor 30 in the above positional relationship moves toward the farthest readable position from the standby position, buckling of the flat cable 37 generally does not occur. As described above, when such the elastic urging force is not necessary, the elastic member 41 generally remains in its original state. That is, the elastic member 41 is not elastically deformed at all times, thereby reducing the likelihood that the elastic member 41 will become permanently deformed.

The elastic member 41 is disposed so as to be positioned under the flat cable 37 when the distance between the curved portion 40 of the flat cable 37 and the image sensor 30 is at a minimum length. In this configuration, the weight of the flat cable 37 may act on the elastic member 41, thereby correcting any permanent deformation of the elastic member 41.

The standby position of the image sensor 30 refers to a position at which the distance between the curved portion 40 of the flat cable 37 and the image sensor 30 is at a minimum length. In the standby position, the elastic member 41 is in its original state and the weight of the flat cable 37 acts on the elastic member 41. Generally, a length of time that the image sensor 30 is in the standby state is longer than a length of time that the image sensor 30 is in an operating state. Therefore, the elastic member 41 stays in the original state for a relatively longer amount of time and thus, stays in the elastically-deformed state for a relatively shorter amount of time. As a result, the elastic member 41 is less likely to become deformed by itself (i.e., permanently deformed). Any deformation of elastic member 41 may further be corrected by the weight of flat cable 37 acting on elastic member 41. The standby position of the image sensor 30 is not limited to the position where the distance between the curved portion 40 of the flat cable 37 and the image sensor 30 is the minimum length. Any position may be defined as a standby position of the image sensor 30 when the elastic member 41 is in its original state.

The engagement of the elastic member 41 and the cable 37 is not limited to the above-described embodiment using the hooks 44, 45. Other embodiments can be adopted. Hereinafter, an elastic member 51 will be described as a variation with reference to FIGS. 12 and 13.

Figure 13:
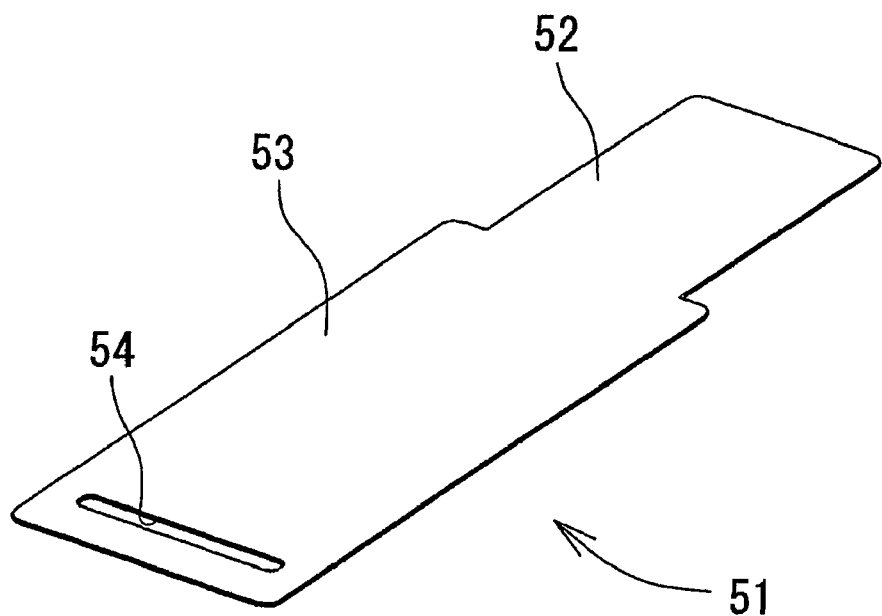
FIG. 13 is a perspective view showing a structure of the elastic member of FIG. 12.

As shown in the plan view of FIG. 13, the elastic member 51 is a substantially rectangular and thin plate. The elastic member 51 is capable of being elastically deformed so as to be curved, and is configured to elastically return to its original state (a straight posture) as shown in FIG. 13. In one or more arrangements, the elastic member 51 is made of a thin plate of metal, for example, spring steel or phosphor bronze, or is made of a thin plate of synthetic resin, for example, polyethylene terephthalate (PET).

The elastic member 51 includes a fixed portion 52 and a deforming portion 53. The elastic member 51 has substantially the same structure as that of the elastic member 41 of the above-described embodiment, except for a shape of an end portion of the deforming portion 53. Therefore, the fixed portion 52 and the deforming portion 53 of the elastic member 51 corresponds to the fixed portion 42 and the deforming portion 43 of the elastic member 41, respectively. The structure of the fixed portion 52 of the elastic member 51 retained by the retainer 39 and the length of the deforming portion 53 of the elastic member 53 may be substantially the same as those of the elastic member 41.

The deforming portion 53 of the elastic member 51 has a slit 54 (e.g., rather than hooks 44 and 45) that is elongated in a width-wise direction of the deforming portion 53. The slit 54 passes through an end portion of the deforming portion 53 in a thickness direction of the deforming portion 53. A length of the slit 54 in its longitudinal direction corresponds to the width of the flat cable 37 and a width of the slit 54 in its shorter direction corresponds to the thickness of the flat cable 37.

Figure 12:
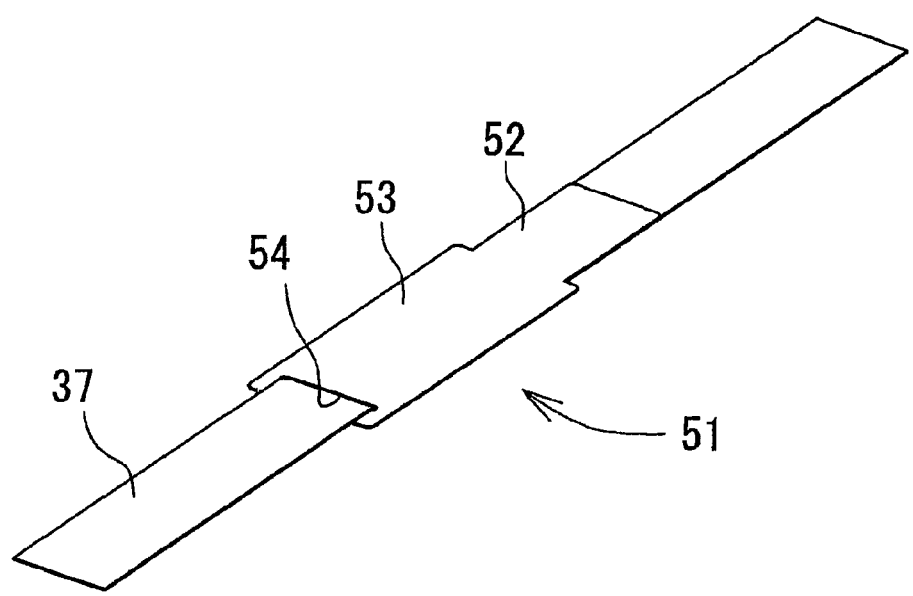
FIG. 12 is a perspective view showing a back side of an elastic member engaged with the flat cable of an embodiment.

As shown in FIG. 12, the elastic member 51 is engaged with the flat cable 37 through the slit 54. The elastic member 51 is provided on the back side of the flat cable 37 (on the opposite side shown in FIGS. 2 and 3 or on the outer surface of the curved portion 40 of the flat cable 37) so as to extend along the flat cable 37. Additionally, the flat cable 37 is inserted into the slit 54, so that the end portion (e.g., a portion more distal from fixed portion 52 than the slit 54) of the deforming portion 53 is disposed on the front side of the flat cable 37 (on the inner surface of the curved portion 40 of the flat cable 37). Thus, the elastic member 51 is engaged with the flat cable 37 via the slit 54 with the deforming portion 53 catching the front and back sides of the flat cable 37.

By employing the elastic member 51 described above, the same effects as those obtained by the provision of the elastic member 41 may be achieved. In the elastic member 51, the flat cable 37 is inserted into the slit 54. Therefore, the elastic member 51 is securely engaged with the flat cable 37, so that the flat cable 37 does not easily disengage from the elastic member 51 while the image sensor 30 and the carriage 31 reciprocate.

Hereinafter, another illustrative embodiment to which a scanning device of the invention is applied to an image recording device, such as an inkjet printer, will be described with reference to FIGS. 14 and 15. An inkjet printer may be implemented as an inkjet printer 3 used in the multifunctional machine 1 of FIG. 1.

Figure 14:
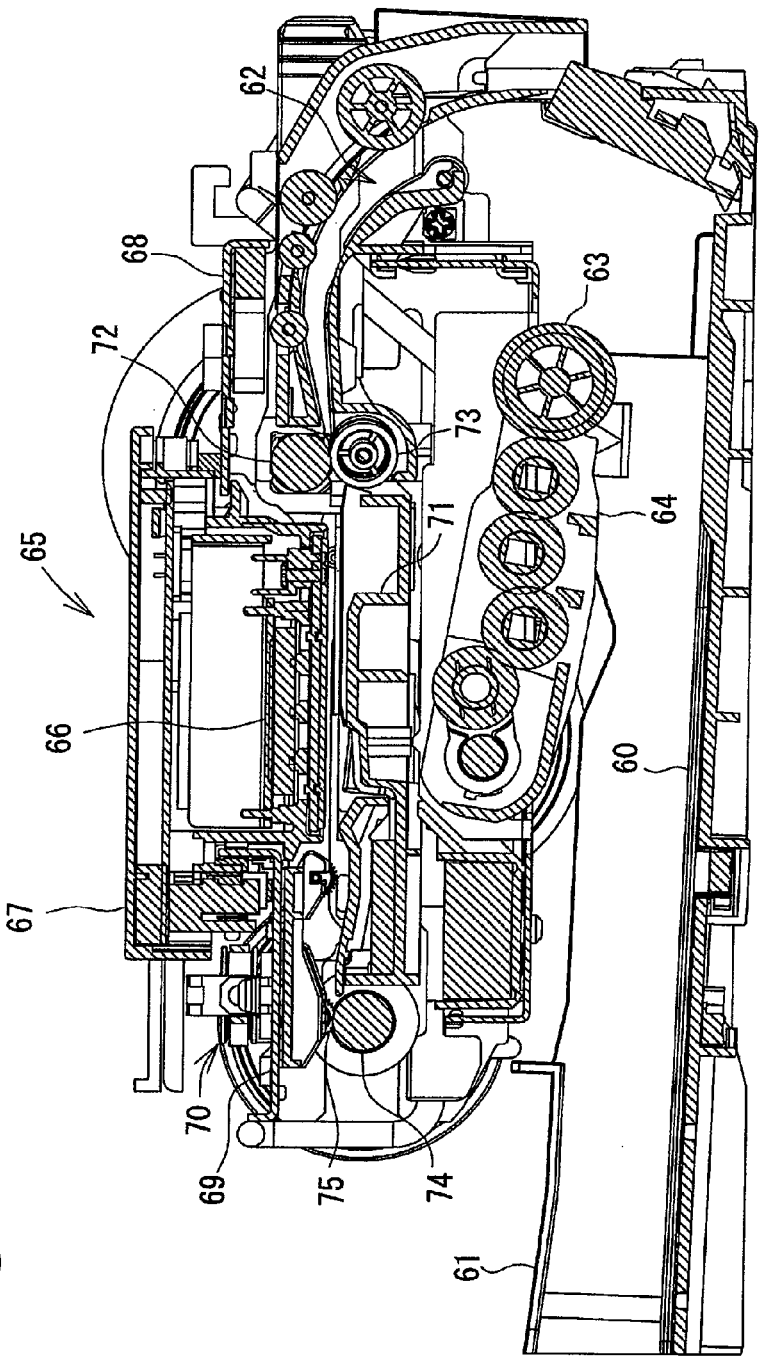
FIG. 14 is a sectional view showing an internal structure of an inkjet printer according to another illustrative embodiment.

As shown in FIG. 14, the inkjet printer 3 includes a sheet supply tray 60 and a sheet output tray 61, which are disposed one above the other inside the inkjet printer 3. The inkjet printer 3 includes a recording sheet conveying path 62 extending from the sheet supply tray 60 to the sheet output tray 61. The recording sheet conveying path 62 has a U-shape extending upward from the sheet supply tray 60 and completely changing direction.

A sheet supply roller 63 is provided above the sheet supply tray 60. The sheet supply roller 63 is rotatably supported at an end of an arm 64 that swings up and down. The sheet supply roller 63 contacts a stack of recording sheets loaded in the sheet supply tray 60, and rotates to supply recording sheets, one by one, to the recording sheet conveying path 62 from the stack.

The inkjet printer 3 includes an image recording part 65 at a position immediately downstream of the U-shaped portion of the recording sheet conveying path 62 as shown in FIG. 14. The image recording part 65 includes a recording head 66 and a carriage 67. The recording head 66 functions as a recording head in various embodiments described herein. Further, the recording head 66 and the carriage 67 function as a movable body.

The recording head 66 is supplied with different colors of ink, such as cyan (C), magenta (M), yellow (Y), and black (Bk), through respective ink supply tubes from respective ink tanks. In FIG. 14, the ink tanks and the ink supply tubes are not shown. The recording head 66 ejects fine ink droplets by using the different colors of the supplied ink.

The carriage 67 is provided with the recording head 66. The carriage 67 is disposed so as to act as a bridge between guide rails 68 and 69. According to one or more embodiments, the guide rails 68, 69 are flat plates that extend in a direction that the carriage 67 reciprocates (in a direction perpendicular to the drawing in FIG. 14). The guide rails 68, 69 are disposed at a distance from each other in a recording sheet conveying direction (in a right-left direction in FIG. 14). The recording head 66 is disposed within a space disposed between the guide rails 68 and 69. Therefore, the recording head 66 is capable of ejecting ink droplets downward from the space between the guide rails 68 and 69.

The guide rail 69 is provided with a belt drive mechanism 70. The belt drive mechanism 70 includes a drive pulley, a follower pulley, and a timing belt that runs between the drive pulley and the follower pulley, although not shown in FIG. 14. The carriage 67 is connected to the timing belt. Therefore, when the timing belt travels around the drive pulley and the follower pulley, the carriage 67 reciprocates on the guide rails 68, 69. The recording head 66 is disposed on the carriage 67, and thus, the recording head 66 reciprocates together with the carriage 67.

The inkjet printer 3 includes a platen 71, which is provided at a position facing the recording head 66. The recording sheet is conveyed onto the platen 71. Each color of ink is selectively ejected toward the platen 71 from the recording head 66 provided on the reciprocating carriage 67. By doing so, the ejected ink droplets land on the recording sheet being conveyed on the platen 71.

A pair of rollers 72, 73 is provided upstream of the image recording part 65 with respect to the recording sheet conveying direction. The rollers 72, 73 pinch the recording sheet being conveyed through the recording sheet conveying path 62, and further convey the recording sheet onto the platen 71. A pair of rollers 74, 75 is provided downstream of the image recording part 65 with respect to the recording sheet conveying direction. The rollers 74, 75 pinch and further convey the recording sheet on which recording has been finished. A drive force is transmitted to a predetermined roller of the rollers 72 to 75 from a motor. Therefore, the rollers 72 to 75 intermittently rotate by a predetermined conveying amount. The recording head 66 reciprocates while the rollers 72 to 74 intermit. By doing so, an image is successively recorded on the recording sheet from its leading edge to its trailing edge. Then, the recording sheet on which the image recording has been completed is outputted onto the sheet output tray 61.

Figure 15:
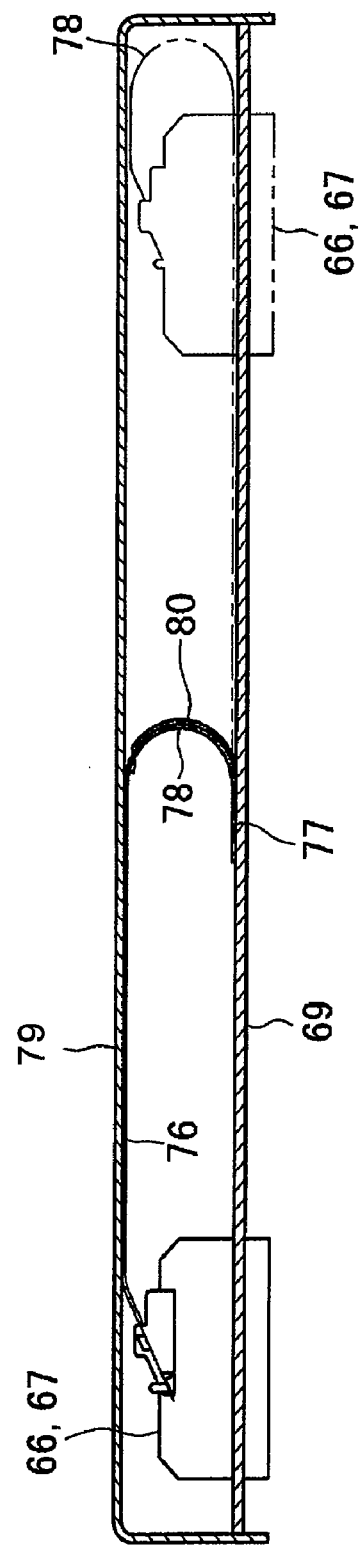
FIG. 15 is a schematic view illustrating an operation of a recording head and a carriage provided in the inkjet printer of FIG. 14.
Figure 16:
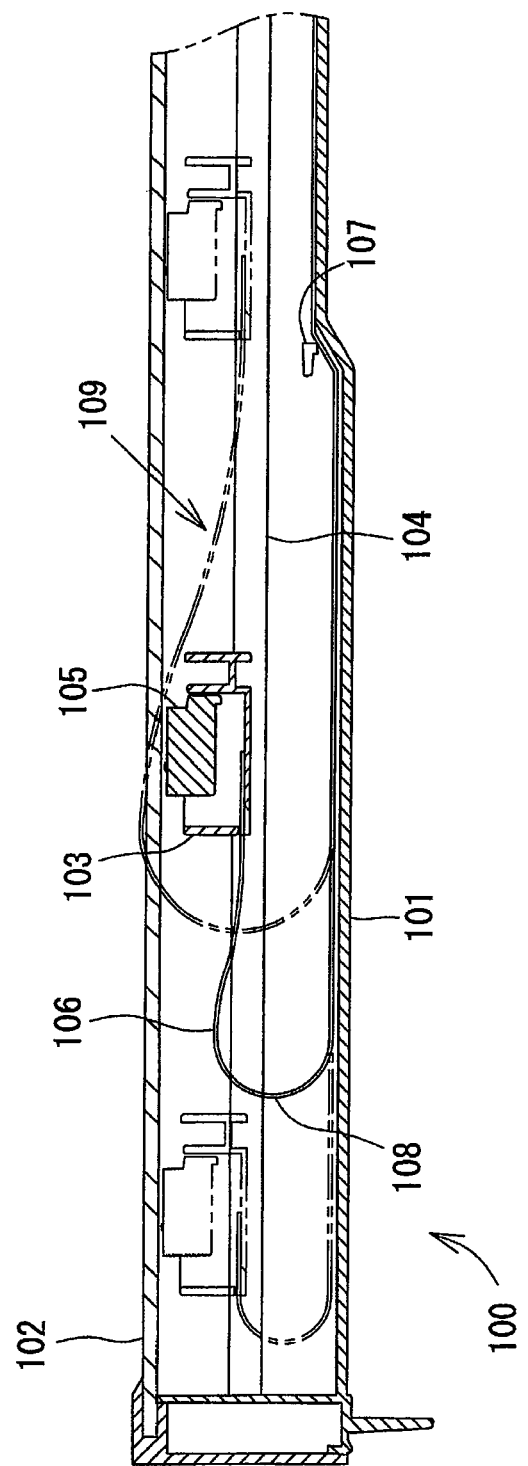
FIG. 16 is a sectional view showing an internal structure of a flatbed scanner including a typical scanning device.

As shown in FIG. 15, a cover 79 is provided above the guide rails 68, 69 at a predetermined distance from the guide rails 68, 69. The cover 79 and the guide rails 68, 69 provide a space therebetween, and the carriage 67 reciprocates within the space. The guide rails 68, 69 and the cover 79 correspond to the first structural member and the second structural member, respectively. In FIG. 15, an outer shape of the recording head 66 provided on the carriage 67 is omitted. The guide rail 68 is not shown in the drawing due to being disposed behind the guide rail 69.

The cover 79 is provided to prevent the carriage 67, a flat cable 76, and their surrounding parts or members from making contact with other parts or members. The cover 79 is provided to protect the carriage 67 from careless handing when a sheet jam is cleared.

The flat cable 76 is connected at one end to the recording head 66 provided on the carriage 67. The flat cable 76 transmits an electrical signal from a control board to the recording head 66 in similar fashion to that described with respect to flat cable 37. Thus, a detailed description of the flat cable 76 will be omitted. The other end of the flat cable 76 is connected to the control board. The one end of the flat cable 76 connected to the control board functions as the first end of the cable. The other end of the flat cable 76 connected to the recording head 66 functions as the second end of the cable.

As shown in FIG. 15, the flat cable 76 extends from the recording head 66 and is fixed at a fixing portion 77 of the guide rail 69. The flat cable 76 is routed so as to make a U-turn to have a substantially U-shaped curved portion 78 between the recording head 66 and the fixed portion 77. When the recording head 66 reciprocates on the guide rail 69 together with the carriage 67, the flat cable 76 follows the reciprocating movement of the recording head 66 while its posture (e.g., position and/or shape) changes and the curved portion 78 moves between the recording head 66 and the fixing portion 77.

An elastic member 80 will be described. As shown in FIG. 15, the elastic member 80 is disposed at a position where the flat cable 76 is fixed by the fixing portion 77, so as to extend along the flat cable 76. The elastic member 80 is fixed at its one end by the fixing portion 77 together with the flat cable 76, and is engaged at its other end to the flat cable 76. In the elastic member 80, the end portion of the elastic member 80 fixed by the fixing portion 77 functions as the first end portion of the elastic member, and the end portion of the elastic member 80 engaged with the flat cable 76 functions as the second end portion of the elastic member. The elastic member 80 is generally disposed on an outer surface of the curved portion 78 of the flat cable 76. With this structure, the elastic member 80 elastically urges the flat cable 76 against the curve of the curved portion 78 of the flat cable 76.

The elastic member 80 has a similar structure to those of the elastic members 41, 51 described above. Therefore, an explanation for the structure of the elastic member 80 will be omitted.

As shown in FIG. 15, the carriage 67 slides on the guide rails 68, 69 to reciprocate within a space defined by the guide rails 68, 69 and the cover 75. The recording head 66 provided on the carriage 67 reciprocates together with the carriage 67. Along with this, the flat cable 67 connected to the recording head 66 follows the reciprocating movement of the recording head 66. In the flat cable 76, the position of the curved portion 78 changes as the flat cable 76 follows the recording head 66. In FIG. 15, when the recording head 66 is in a state indicated by a solid line, the curved portion 78 of the flat cable 76 is located at a farthest position with respect to the recording head 66. When the recording head 66 is in a state indicated by a double dotted line, however, the curved portion 78 of the flat cable 76 is located at a nearest position with respect to the recording head 66.

In the state indicated by the solid line in FIG. 15, the elastic member 80 is elastically deformed along the curved portion 78 of the flat cable 76. In this state, an elastic urging force acting in a direction opposite to a curving direction of the curved portion 78 is exerted by elastic member 80. Thus, the flat cable 76 extending between the curved portion 78 thereof and the recording head 66 becomes straight under a tension caused by the elastic urging force.

When the carriage 67 moves toward the position indicated by the double dotted line from the position indicated by the solid line in FIG. 15, the curved portion 78 of the flat cable 76 also moves in the same direction. In accordance with the shift of the curved portion 78, the elastic member 80 gradually elastically returns to its original state.

While the elastic member is elastically deformed, the flat cable 76 is elastically urged by the elastic member 80 toward the direction opposite to the curving direction of the curved portion 78. Therefore, an appropriate tension acts on the portion of the flat cable 76 extending between the curved portion 78 and the recording head 66 and thus the portion of the flat cable 76 is kept straight. In the flat cable 76, a portion extending between the curved portion 78 and the fixing portion 77 is elastically urged to straighten along the guide rail 69. Thus, even if the flat cable 76 makes contact with the cover 75, buckling is prevented from occurring in a portion of the flat cable 76 extending between the curved portion 78 and the recording head 66. Accordingly, the flat cable 76 can smoothly move in accordance with the reciprocating movement of the recording head 66 and the carriage 67.

Because the elastic member 80 has a similar structure to those of the elastic members 41, 51, the same effects as those obtained by the provision of the elastic members 41, 51 can be achieved. For example, the flat cable 76 and the elastic member 80 can be easily assembled. Once assembled, the flat cable 76 and the elastic member 80 might not be easily separated from each other. Further, the elastic member 80 is less likely to become deformed by itself.

The elastic member 80 is disposed so as to be positioned under the flat cable 76 when a distance between the curved portion 78 of the flat cable 76 and the recording head 66 is a minimum length. With this structure, the weight of the flat cable 76 acts on the elastic member 80, so that a correction of the tendency of the elastic member 80 to be deformed by itself is expected. A standby position of the recording head 66 refers to a position at which the distance between the curved portion 78 of the flat cable 76 and the recording head 66 is the minimum length. Therefore, the elastic member 80 is less likely to become deformed by itself, and the correction of the tendency of the elastic member 80 to be deformed by itself is further expected.

While the invention has been described in detail with reference to the specific embodiments thereof, it would be apparent to those skilled in the art that various changes, arrangements and modifications may be applied therein without departing from the spirit and scope of the invention.

What is claimed is:

1. A scanning device comprising:
    a first structural member and a second structural member;
    a movable body that is configured to reciprocate between the first structural member and the second structural member;
    a cable of which a first end is fixed to one of the first and second structural members and a second end is fixed to the movable body, the cable having a curved portion between the first end and the second end thereof; and
    an elastic member having:
        a first end portion fixed to the one of the first and second structural members to which the first end of the cable is fixed, and
        a second end portion engaged to the curved portion of the cable,
    wherein the elastic member is configured to elastically urge the cable in a direction opposite to a curving direction of the curved portion of the cable.

2. The scanning device according to claim 1, wherein the elastic member includes a hook at the second end portion.

3. The scanning device according to claim 1, wherein the elastic member has an opening at the second end portion, the opening configured to receive the cable.

4. The scanning device according to claim 1, wherein the elastic member is elastically deformed along the curved portion when the movable body is at a maximum distance from the curved portion of the cable.

5. The scanning device according to claim 1, wherein the elastic member is elastically returned to a substantially flat configuration along the one of the first and second structural members when the movable body is at a minimum distance from the curved portion of the cable.

6. The scanning device according to claim 1, wherein the elastic member is disposed so as to be positioned under the cable when the movable body is located at a first position that is a minimum distance from the curved portion of the cable.

7. The scanning device according to claim 6, wherein the first position of the movable body corresponds to a standby position of the movable body.

8. The scanning device according to claim 1, wherein the movable body includes an image sensor, and
    wherein the cable is configured to transmit an electric signal to the image sensor.

9. The scanning device according to claim 1, wherein the movable body includes a recording head configured to perform an image recording, and
    the cable is configured to transmit an electric signal to the recording head.

10. The scanning device according to claim 1, wherein the first end portion is fixed to an outer surface of the curved portion of the cable with respect to the curving direction of the curved portion.

11. The scanning device according to claim 1, wherein the second end portion is fixed to an inner surface of the curved portion of the cable with respect to a the curving direction of the curved portion.

12. A scanning device comprising:
a frame;
a movable body that is configured to reciprocate between a first position and a second position along the frame;
a cable including a first end, a second end, and an intermediate portion, wherein the first end is fixed to the frame, the second end is fixed to the movable body and the intermediate portion is positioned between the first end and the second end and is capable of being curved; and
a plate fixed to the intermediate portion and capable of being elastically deformed, the plate including a stable portion and an operating portion, the operating portion having a fixing portion that is configured to attach to the intermediate portion,
wherein the intermediate portion of the cable and the operating portion of the plate extend along the frame when the movable body is located at a first position, and
wherein the intermediate portion of the cable and the operating portion of the plate are curved when the movable body is located at a second position different from the first position.

13. The scanning device according to claim 12, wherein the cable is a flexible flat cable.

14. The scanning device according to claim 12, wherein the fixing portion includes a hook.

15. The scanning device according to claim 12, wherein the fixing portion includes an opening through which the cable passes.

16. The scanning device according to claim 12, further comprising a restricting member that restricts separation of the stable portion from the frame.

17. The scanning device according to claim 12, wherein the cable has a width that is substantially the same as a width of the stable portion.

18. The scanning device according to claim 12, wherein the operating portion has a width that is wider than a width of the cable.

19. The scanning device according to claim 12, wherein the plate is made of metal.

20. The scanning device according to claim 12, wherein the operating portion of the plate is positioned in between the intermediate portion and the frame when the movable body is in the first position, and
wherein the fixing portion of the plate is separated from the frame when the movable body is in the second position.

* * * * *

UNITED STATES PATENT AND TRADEMARK OFFICE
CERTIFICATE OF CORRECTION

PATENT NO.       : 7,969,621 B2
APPLICATION NO.  : 11/857529
DATED            : June 28, 2011
INVENTOR(S)      : Shunji Murai It is certified that error appears in the above-identified patent and that said Letters Patent is hereby corrected as shown below:

Title page
Item (12) should read --Murai--
Item (75) should read --Shunji Murai--

Signed and Sealed this
Eighth Day of May, 2012

David J. Kappos
*Director of the United States Patent and Trademark Office*